UNITED STATES PATENT OFFICE.

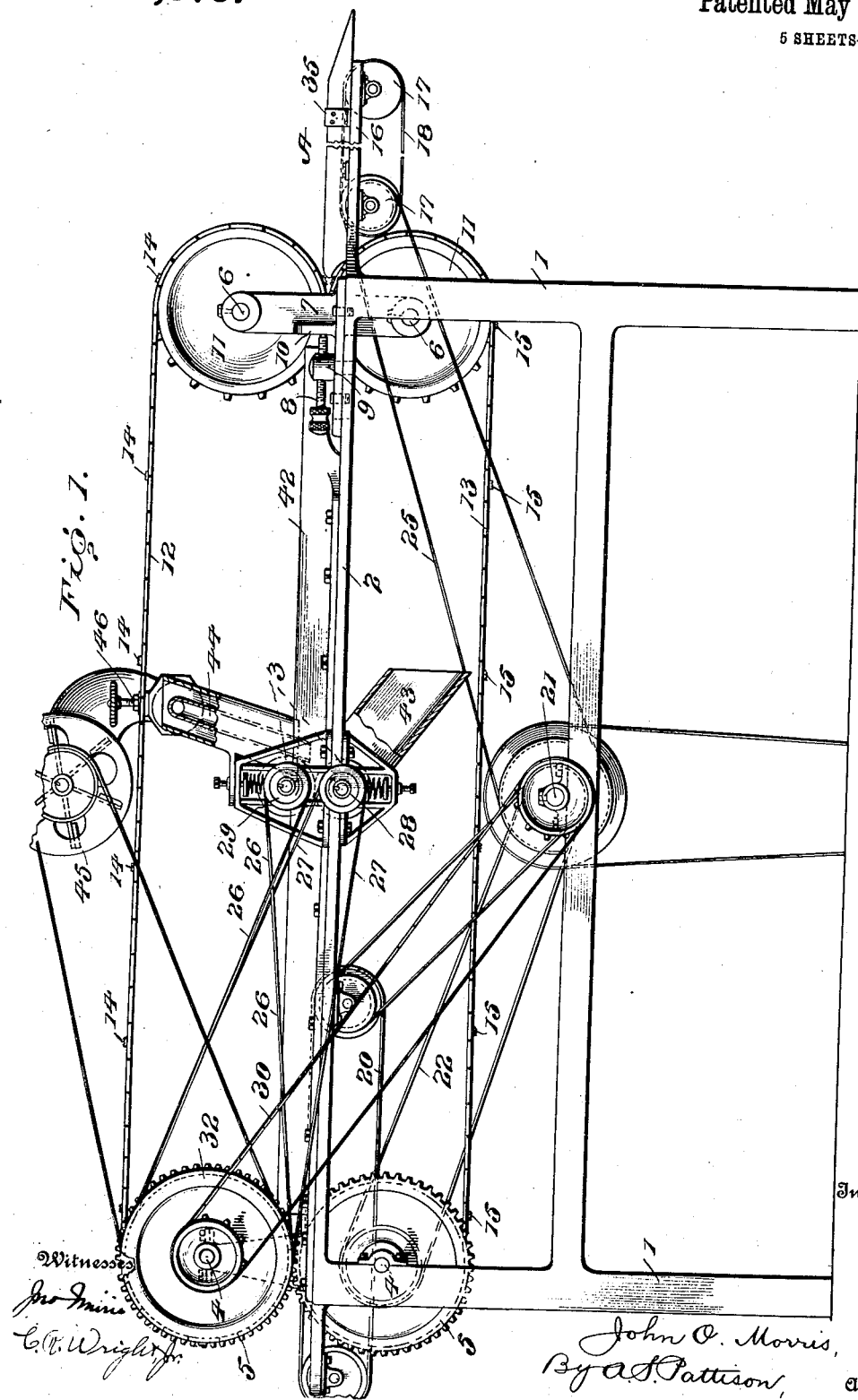

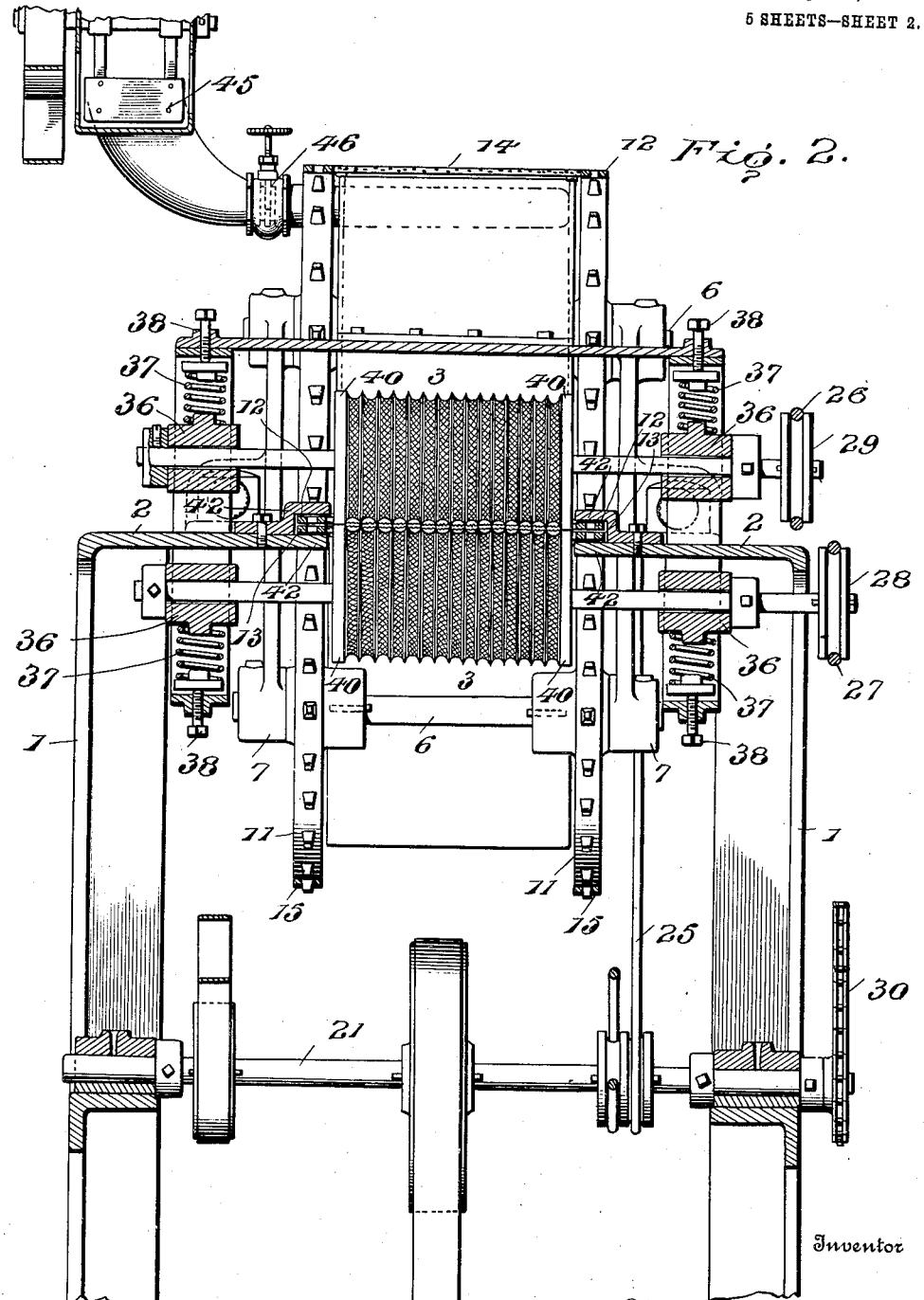

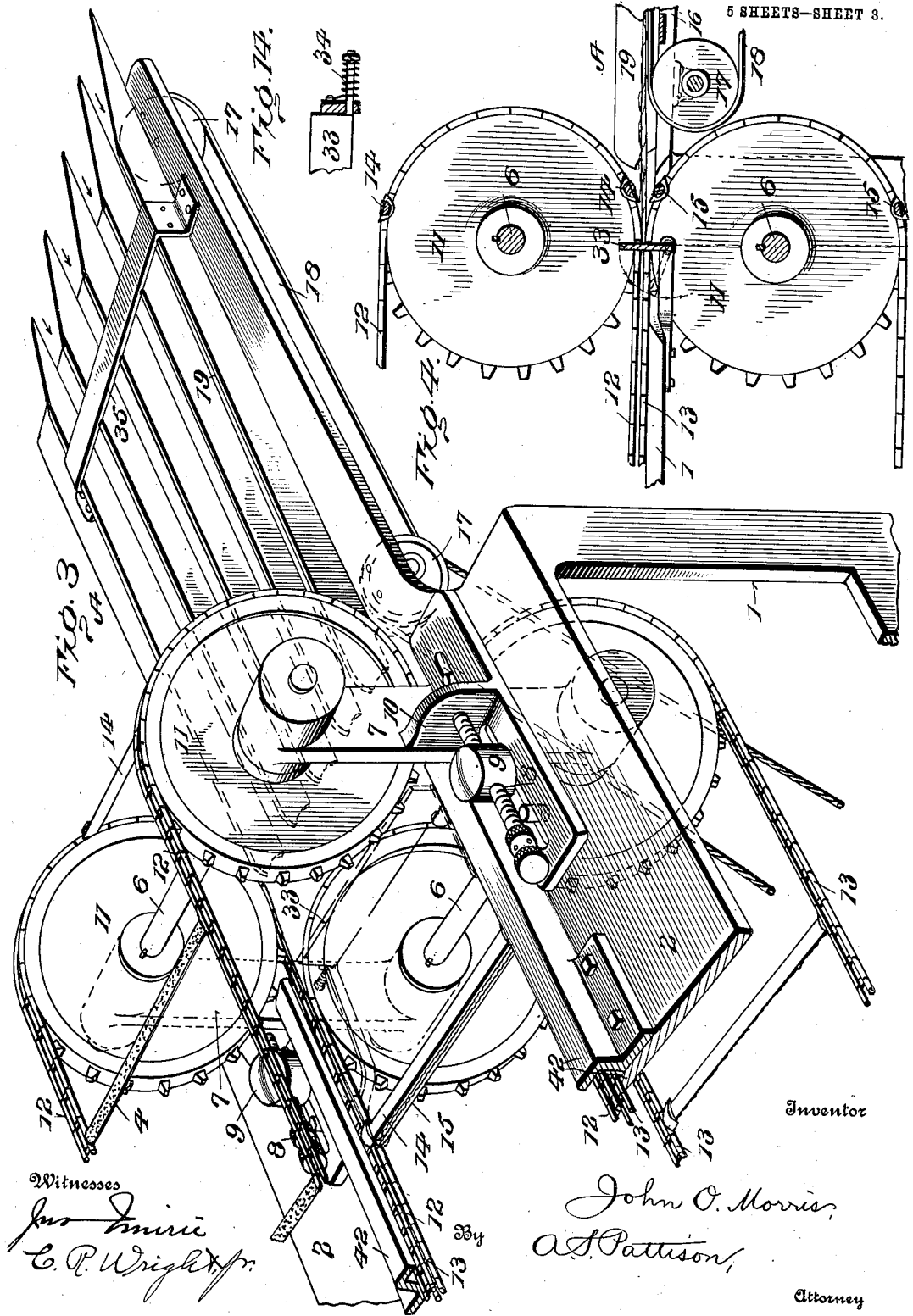

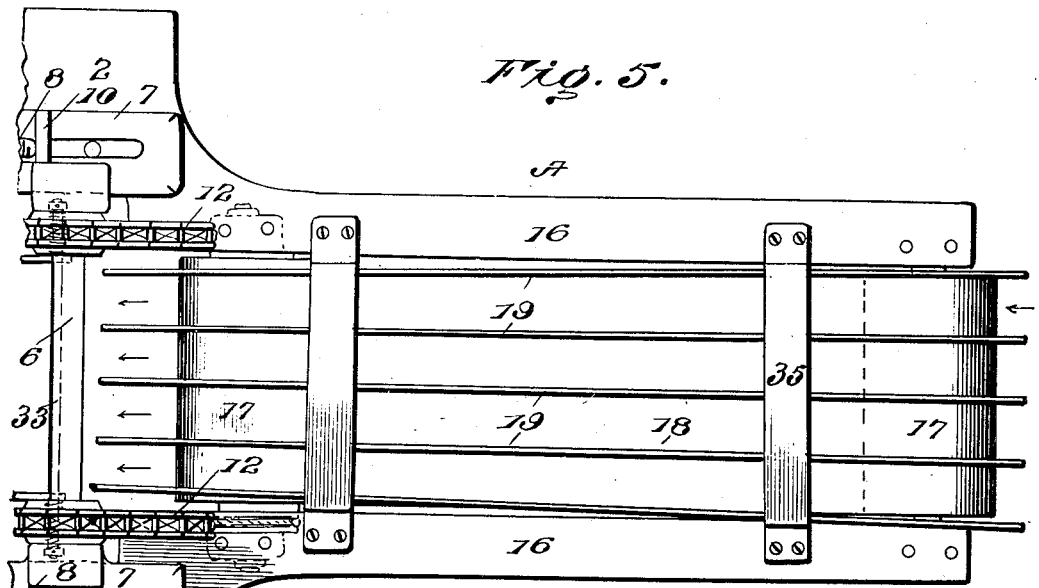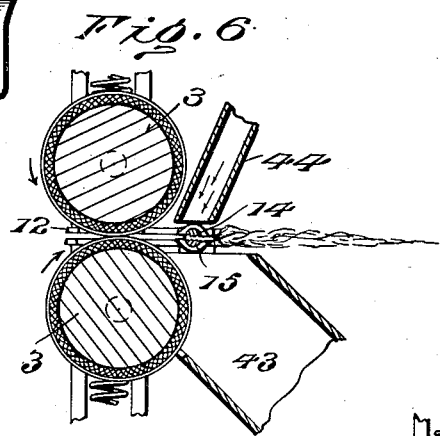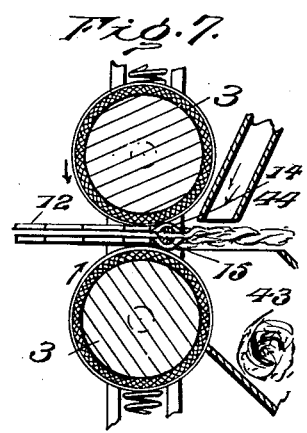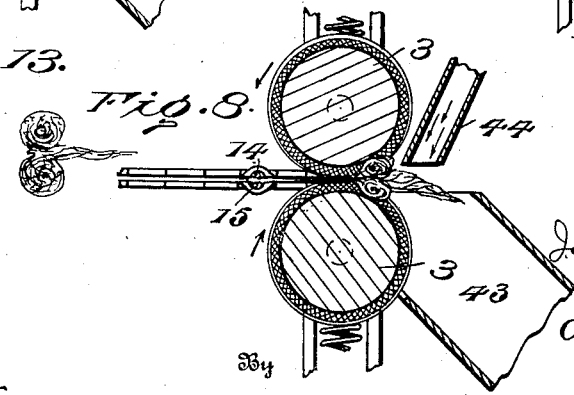

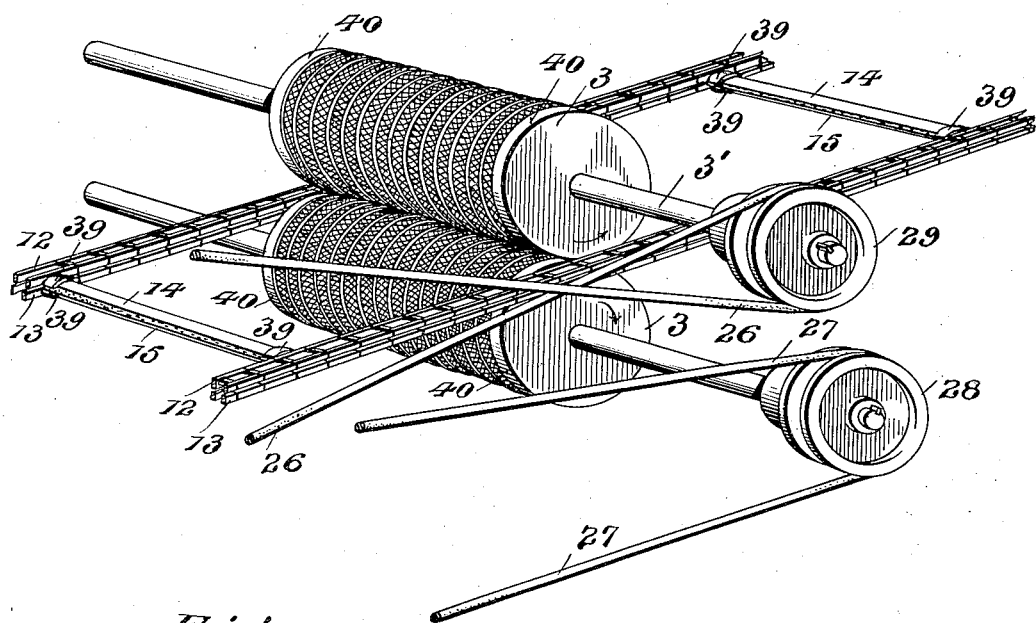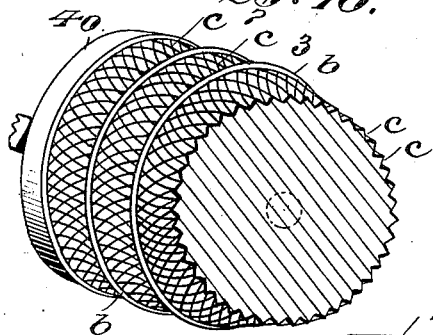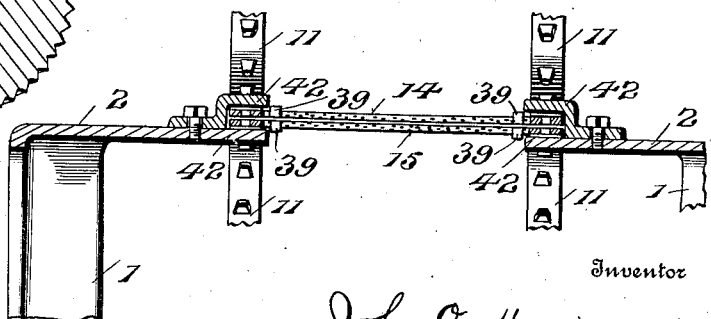

JOHN ODEN MORRIS, OF WASHINGTON, DISTRICT OF COLUMBIA, ASSIGNOR TO SOUTHERN STEMMING MACHINE AND MANUFACTURING COMPANY, OF GUTHRIE, OKLAHOMA, A CORPORATION OF OKLAHOMA.

TOBACCO-STEMMING MACHINE.

959,375.      Specification of Letters Patent.      Patented May 24, 1910.

Application filed February 16, 1907. Serial No. 357,684.

*To all whom it may concern:*

Be it known that I, JOHN ODEN MORRIS, a citizen of the United States, residing at Washington, in the District of Columbia, have invented certain new and useful Improvements in Tobacco-Stemming Machines, of which the following is a specification, reference being had therein to the accompanying drawing.

This invention relates to improvements in tobacco stemming machines, and involves certain improvements, the construction, operation and object of which will be fully set forth hereinafter.

It is well known and understood by manufacturers and those skilled in this art, that when the tobacco leaves reach the stemmer, they are in a moist condition, and that the leaf portions, together with the linear or radiating stems or veins of the leaves are not straightened out, but to the contrary are bunched adjacent the main stems, and almost universally the leaf portions, and also the linear stems are partially, and in some instances entirely twisted around the main stem portions, so that the complete leaf when it reaches the stemmer is in a condition resembling more a loosely formed rope with a central stem, than it does an ordinary leaf, as usually considered. For this reason it has been difficult to handle the tobacco leaves in this condition, and to stem them by machinery, which is necessary in order to compete with the skilled hand stemmers.

One object of my present invention is to so construct stripping rolls that they will receive the tobacco leaves in this condition and without any previous straightening out, or other preliminary preparation, and remove the stem by a clean and smooth cut without any ragging of the leaf portion of the tobacco, and much more rapidly and expeditiously than it is possible to do it by hand, and to accomplish it with a very much better result, so far as the condition of the leaf portions is concerned, and so far as leaving any portions of the leaf remaining to the stem is concerned.

The object also of my present invention is to so construct the stripping rolls that in the process of stripping the leaf portions and the linear stems from the main stem, they are caused to unfold or untwist from the main stem portion before they reach the actual cutting, which prevents any injury thereto, and the stripping rolls are so constructed that the leaf portions, together with the linear stems are caused to roll or bunch at opposite sides of the main stem just in front of the stripping rolls, which when the stripping is completed, will be delivered into a suitable conveyer at a point in front of the stripping rolls, and prevent any possibility of injury from the rolls.

In stripping machines heretofore known to me there has been a tendency of the mechanism to tear the leaf from the linear stems, and a tendency of the stripping action to follow the radiating direction of these linear stems, which of course makes a ragged edge to the leaf, and in some instances this is so marked as to be almost prohibitive to the use of such mechanical devices.

Another object of my present invention is to so construct the stripping rolls as to absolutely prevent any tendency of the stripping action to follow the radiating direction of the linear stems of the leaves.

Another object of my invention is to provide a mechanism which will simultaneously strip a plurality of leaves, and thus make the capacity of the machine equal to the ability of the person to feed the leaves thereto, and indeed may be capable of stripping a sufficient number of leaves simultaneously as to require more than one person to feed the leaves as rapidly as the machine can handle them It is also well known to those skilled in this art that in the stripping of tobacco for certain purposes, it is desirable and economical to leave a portion of the fine end of the main stem in the extremity of the leaf, and this is accomplished in hand stemming by breaking the main stem at the desired point, and then stripping the stem from the leaf from this broken point to the butt or foot end of the stem.

Another object of my present invention is to effect this result by stripping the leaf portions from the butt or foot end of the stem to the point where it is desired to break it, and when this point is reached, to break the main stem and deliver the stripped portions of the leaf together with the unstripped portions, and the remaining stem portion to the conveyer.

My present invention also involves other specific and detailed improvements having certain specified objects, which will be pointed out in the description of the construction and operation and results of these improvements.

In the accompanying drawings, Figure 1, is a side elevation of a machine embodying my invention. Fig. 2, is a cross-sectional view on the line 2—2 of Fig. 1. Fig. 3, is an enlarged perspective view of the feeding end of the machine. Fig. 4, is a sectional view taken centrally and transversely through the receiving end of the leaf gripping and conveying devices. Fig. 5, is an enlarged plan view of the feeding conveyer and the receiving end of the gripping and conveying mechanism. Fig. 6, is a transverse sectional view through the stripping rolls showing a tobacco leaf in the act of being delivered thereto. Fig. 7, is a similar view showing the grippers passing between the stripping rolls. Fig. 8, is a similar view showing the tobacco leaf partially stripped. Fig. 9, is a detached perspective view of the stripping rolls, together with their shafts, pulleys and cams, and the gripping and conveying members, the journals and mountings for the stripping rollers being omitted. Fig. 10, is an enlarged detached sectional perspective view of one of the stripping rolls. Fig. 11, is a transverse sectional view through the conveying and gripping devices. Fig. 12, is an enlarged longitudinal sectional view showing a portion of the cutting and stripping surfaces of the stripping rolls. Fig. 13, is a detached view of a tobacco leaf showing it partially stripped and the unstripped portion of the stem and the stripped portions of the leaf broken from the stripped part of the main stem. Fig. 14 is a detached view of a portion of the automatically controlled swinging stop for the leaves as they are fed to the gripping point.

In carrying out this invention, a suitable supporting frame 1 is provided, above the top 2 of which the tobacco leaves are conveyed, and the stems stripped therefrom. The stripping rolls 3 are located at a point intermediate the top 2. Journaled at the left-hand end of the supporting frame are two shafts 4 which carry at opposite ends thereof the two sprocket wheels 5, and at the opposite ends of the supporting frame the two shafts 6 are journaled in vertically arranged arms 7, and these arms are adjustable through the medium of the screw-bolts 8 which pass through suitable screw-threaded portions 9 carried by the frame and abut against projections 10 of the arms 7. These shafts 6 carry at opposite ends the sprocket wheels 11, and one pair of the sprocket wheels 5 and 11 is located below the top 2 and the other sprocket wheels 5 and 11 are located above the top 2. Passing around the upper sprocket wheels 5 and 11 are sprocket chains 12, and passing around the lower sprocket wheel are the sprocket chains 13. Connecting the upper sprocket chains 12 at proper intervals are the gripping and conveying members 14, and connecting the lower sprocket chains 13 are the gripping and conveying members 15. These gripping members 14 and 15 are located upon the upper and lower sets of chains at corresponding points, so that they will come together as the adjacent portions of the chains meet for the purpose of gripping the stems of the tobacco leaves and conveying them to the stripping rolls, and then conveying the stripped stems to the outlet end of the machine.

A traveling feeder A is located at the receiving end of the machine and consists of a suitable shelf or table 16 having rollers or wheels 17 journaled in opposite ends. Passing around these rollers or wheels is a traveling conveyer 18, and located above the traveling conveyer are a suitable number of longitudinal partitions 19 which divide the feeder into several passage-ways to receive the tobacco leaves and convey them to the receiving end of the machine to be gripped and conveyed to the stripping rolls.

Located at the outlet end of the machine is a suitable traveling conveyer 20 which projects any desired distance beyond the path of travel of the grippers 14 and 15 for the purpose of receiving the stripped tobacco stems and conveying them to any desired point.

A suitable driving shaft 21 is supported by the frame 1, and this driving shaft serves to drive all the several parts of the machine. A suitable belt or driving chain 22 extends from the shaft 21 to the lower shaft 4, and the lower and upper shafts are operatively connected by the gears 32, and serve to cause the rotation of the sprocket wheels 5 and the sprocket chains 12 and 13 cause the rotation of the sprocket wheels 11. A suitable driving belt 25 connects the shaft 21 with the feeding conveyer 18, and a suitable driving belt 25′ connects the shaft 21 with the conveyer 20.

The stripping rolls 3 are driven by a shaft which is separate from the shaft 4, but in line therewith, and this shaft carries suitable pulleys around which pass the conveying belts 26 and 27 for driving the stripper rolls, the shafts of which are provided with the pulleys 28 and 29 around which the said driving belts pass. These stripping rolls revolve in a direction opposite to the travel of the grippers 14 and 15, as shown by arrows in Fig. 1, and they revolve at a high rate of speed. A chain or belt 30 serves to connect the driving shaft 21 with the shaft 31 carrying the pulleys 32 around which the belts 26 and 27, before mentioned, pass.

Located just beyond the point where the grippers meet, or in other words, just beyond or inside of a vertical line drawn through the axes of the shafts 6, is a movable stop 33. In operation, the tobacco leaves in the condition heretofore explained, are fed stem foremost one leaf in each of the passage-ways between the partitions 19, and upon the conveyer 18. They are conveyed thereby and caused to project and have their stem portions strike against the movable stop 33, which serves to hold these leaves in position to be gripped by the grippers 14 and 15. This movable stop 33 is a swinging spring-actuated member, the spring 34 serving to hold it in the upright position shown in Fig. 4. The grippers gripping the leaves push them forward and cause the swinging member to be depressed, as shown in dotted lines Fig. 4, to permit the leaves and the grippers to pass forward, when it at once returns to its upright position to receive and stop the succeeding leaves.

Attention is directed to the fact that the grippers 14 and 15 are elongated and extend in a direction parallel to the axes of the stripping rolls, and are made of a gripping surface as long as the stripping surface of the rolls, so that they will grip a plurality of leaves simultaneously, and simultaneously carry them forward to the stripping rolls. In operation, the operator or operators will stand, preferably at the side of the conveyer 18, and as the tobacco leaves come in bunches the operator takes the bunch, separates it and as rapidly as practicable drops the leaves one each in the passages between the longitudinal partitions 19, and at a point inside of the horizontal partition support 35, with the butt or foot end of the leaf forward, and but a short distance from the inner end of the conveyer 18, so that the conveyer has but a short distance to move the leaves forward with their stems against the stop 33 and in position to be gripped by the grippers and carried forward to be stripped. Since the leaves have to be carried but a short distance by the conveyer 18, it is only necessary that the conveyer travel sufficiently fast to always have leaves in position to be caught by the grippers, and for the purpose of insuring this result the conveyer 18 should travel fully as rapidly as the gripper chains, and since the distance the leaves will have to be conveyed is less than the distance between the grippers on the chains, the conveyer 18 in operation has the same relative result in respect to the travel of the grippers that it would have if it had to move the leaves as far or farther than the distance between the grippers and travel faster for this purpose.

The stripping rolls 3 are journaled in vertically movable bearings 36 which are held by springs 37, and these springs have their tension regulated by means of adjustable bolts 38 for the purpose of having the tension on the bearings substantially equal. Located at the ends of the two parts of the grippers, and at the outer sides thereof, are the cams 39 (shown clearly in Fig. 9) which engage the smooth portions 40 of the stripping rolls 3 and separate them to permit the grippers to pass through without engaging the stripping portion of the rolls, and thus prevents any dulling of the cutting edges of the strippers by the engagement therewith of the grippers. These cam portions separate the rolls just immediately in advance of the grippers, and immediately permit the rolls to assume their stripping positions the instant the grippers pass through.

For the purpose of holding the chains in position to hold the grippers together suitable guide-ways 42 are arranged longitudinally of the top 2, and between these guideways the chains pass, as particularly shown in Fig. 11.

Located below but at a point in front of the stripping rolls is a suitable chute 43 into which the separated leaf portions fall and from which they are conveyed to any suitable point. For the purpose of facilitating the dropping of these separated portions of the leaf, and for the purpose of breaking the small or thin end of the main stem, and leaving it in the leaf, as previously explained, an air blast or conveying tube 44 is located above but just in front of the meeting point of the stripping rolls, and the air may be provided from any suitable pump or fan, as, for instance, shown in Fig. 1 at 45. The point at which the main stem will be broken depends upon the force of the air blast, and this is regulated by a suitable valve 46. The specific action of this device will be presently explained when explaining the action of the stripping rolls.

The specific construction of the stripping rolls is shown in Figs. 10 and 12, and it consists in providing the surfaces of these rolls throughout their length with a plurality of grooves $a$. The apex of the ridges between these grooves are formed into knife edges $b$, and the bottoms of the grooves from the ending of the knife edges are provided with diamond shaped milling or grooves which form the edges $c$ as shown in Fig. 10 throughout the surface of the grooves. In operation, the knife edges $b$ sever the leaf portions from the stem with a smooth cutting edge, and also insure the cutting of the linear or radiating stems and prevents any tendency of the stripping action to follow along the linear stems, and the diamond shaped milling or grooves serve to cause the separated portions to back or roll up in front of the stripping rolls and to cause the projecting portion of the leaf and stem which has not entered between the stripping rolls, to turn around and untwist, and thus accomplish a removal of all of the leaf portions from the main stem without injury. The action in removing the leaf portions from the main stem is approximately illustrated in Fig. 8.

As previously stated, the leaves to be stemmed are suitably moistened, and the thin or small end of the main stem is readily broken when in this condition. For the purpose of breaking the main stem at its small end, and thereby leaving a portion with the leaf portion for practical use, which is recognized as a substantial economy, the air blast is provided. In action, as shown in Fig. 8, the stripping rolls are revolving with their co-acting edges traveling in a direction opposite to the direction of travel of the grippers, so that there is a slight pull upon the stem. This pull, owing to the knife edges of the stripping rolls, of itself is not sufficient to cause a breaking of the main stem. By increasing this pull more or less, the pull will become sufficient to break the main stem, and the point at which the main stem will break of course depends largely upon the force of the air blast, and thereby the increased pull upon the stem. The air blast also causes a bending downward of the projecting unstripped portion of the leaf, as shown in Fig. 8, which being in the nature of a breaking action materially assists in breaking the stem. It is found that the action will cause the main stem to break and to separate as illustrated in Fig. 13.

In order to obtain the best results, the operating surfaces of the stripping rolls should be moving in an opposite direction to the grippers very much faster than the travel of the grippers.

Having thus described my invention, what I claim and desire to secure by Letters Patent, is:—

1. A tobacco-stripping machine comprising horizontally-rotating shafts placed one in a plane above the other, and provided with wheels, endless carriers passing around said wheels, each carrier provided with a gripping member co-acting with each other, and arranged to grip the leaf stem at a point about in a vertical line through the axis of the wheels, and a movable stem positioner located substantially at said gripping point to insure the gripping of the leaf stems.

2. A tobacco stemming machine, comprising stripping members having a plurality of stripping surfaces, the pairs of vertically-arranged wheels 5 and 11, endless carriers passing around these wheels, said carriers connected by co-acting horizontally-extending gripper bars, and a movable stem positioning device located at a point substantially in a vertical line through the axis of the said wheels, whereby the butt of the leaf stem is held at the gripping point.

3. A tobacco stemming machine comprising stripping members having a plurality of stripping surfaces, the pairs of vertically-arranged wheels 5 and 11, endless chains passing around these wheels, horizontal gripper bars connecting said chains as described, and a stem positioning device located in the path traveled by said gripper bars and at a point beyond the gripping action of said bars.

4. A tobacco stemming machine comprising stemming devices having a plurality of stemming surfaces adapted to simultaneously stem several leaves, a traveling gripper having an elongated gripping surface to simultaneously grip and deliver several leaves to the stripping devices, and a stem-positioning device located at the gripping point and elongated in a direction corresponding to the elongation of the grippers.

5. In a tobacco stemming machine, stripping devices consisting of co-acting rolls each having a plurality of grooves divided by ridges, the apex of the ridges formed into circumferential smooth alined knife edges, and the bottoms of the grooves roughened.

6. A tobacco stemming machine comprising stripping devices, a traveling gripper adapted to grip the stem of the tobacco leaves and carry them between the stripping devices, and a leaf-receiver and conveyer located at a point in advance of the action of the gripper, a stop at the gripping point for the leaves, the said receiver and conveyer traveling at a speed faster than the gripper, for the purpose described.

7. A tobacco stemming machine comprising separable stripping rolls having a plurality of stripping surfaces side by side, and a non-stripping surface at the ends of the stripping surfaces, a traveling gripper having an elongated gripping surface for the purpose described, and having at its ends projecting portions of a length slightly greater than the width of the gripper and adapted to engage the non-stripping surfaces of the rolls, for the purpose described.

8. A tobacco stemmer comprising stripping members, a traveling gripper adapted to convey the leaves to the stripping members, and means in advance of the strippers for holding the butt ends of the leaves at the gripping point of the grippers.

9. A tobacco stripping machine comprising stripping members, a continuously traveling gripper, a means in advance of the stripping members for positioning the butt ends of the leaf stems at the gripping point.

10. A tobacco stemming machine comprising stemming devices having stemming surfaces adapted to simultaneously stem a plurality of leaves, a traveling gripper having an elongated gripping surface to simultaneously grip and deliver several leaves to the stripping devices, and a stem-positioning device located at the gripping point and extending the length of the elongated grippers.

In testimony whereof I affix my signature in presence of two witnesses.

JOHN ODEN MORRIS.

Witnesses:
A. S. PATTISON,
JOHN L. FLETCHER.